Jan. 29, 1963  S. S. DAVIS  3,075,647
FILTRATION APPARATUS
Filed March 25, 1960  2 Sheets-Sheet 2
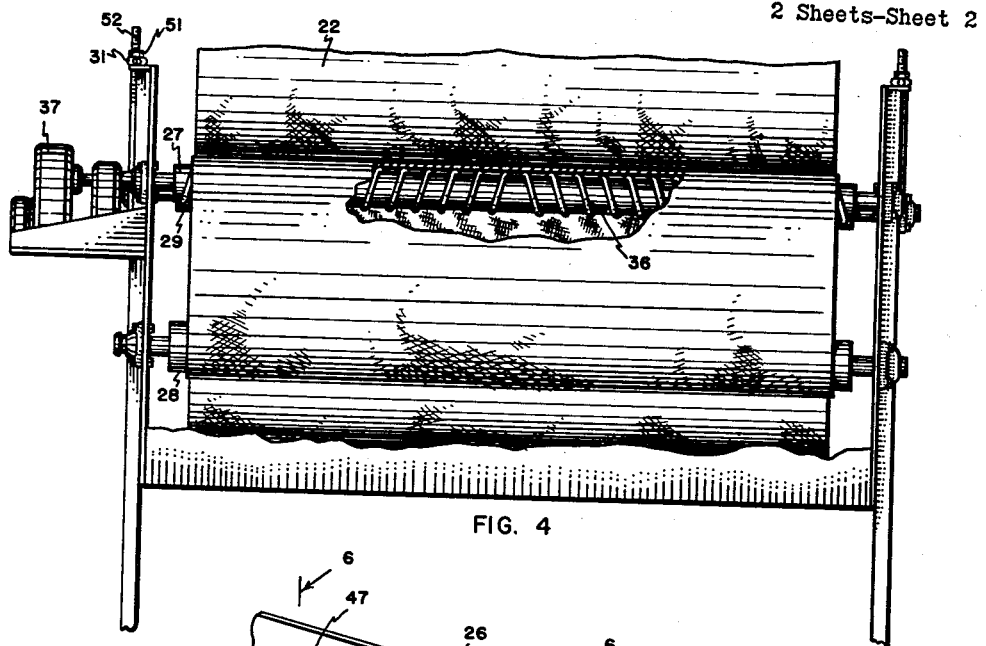
FIG. 4
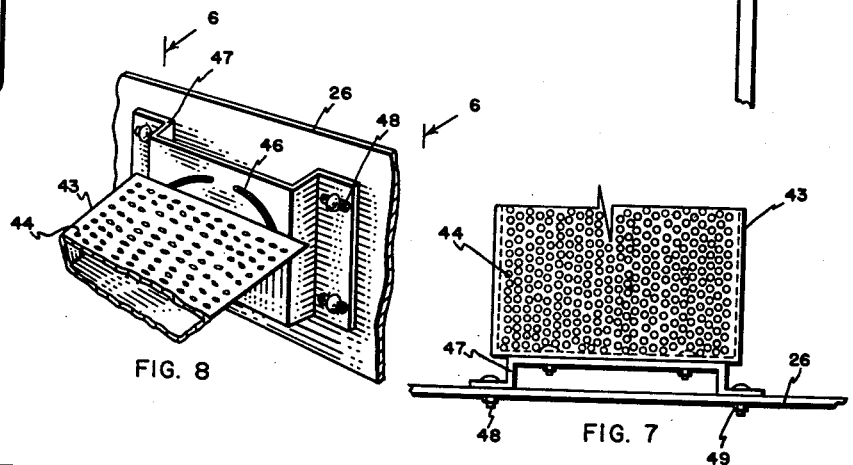
FIG. 8
FIG. 7
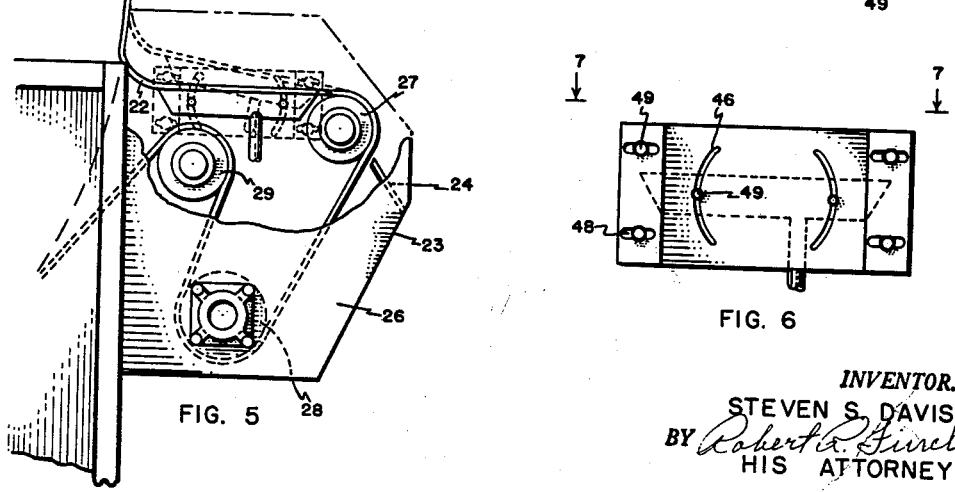
FIG. 5
FIG. 6
INVENTOR.
STEVEN S. DAVIS
BY
HIS ATTORNEY

United States Patent Office 3,075,647
Patented Jan. 29, 1963

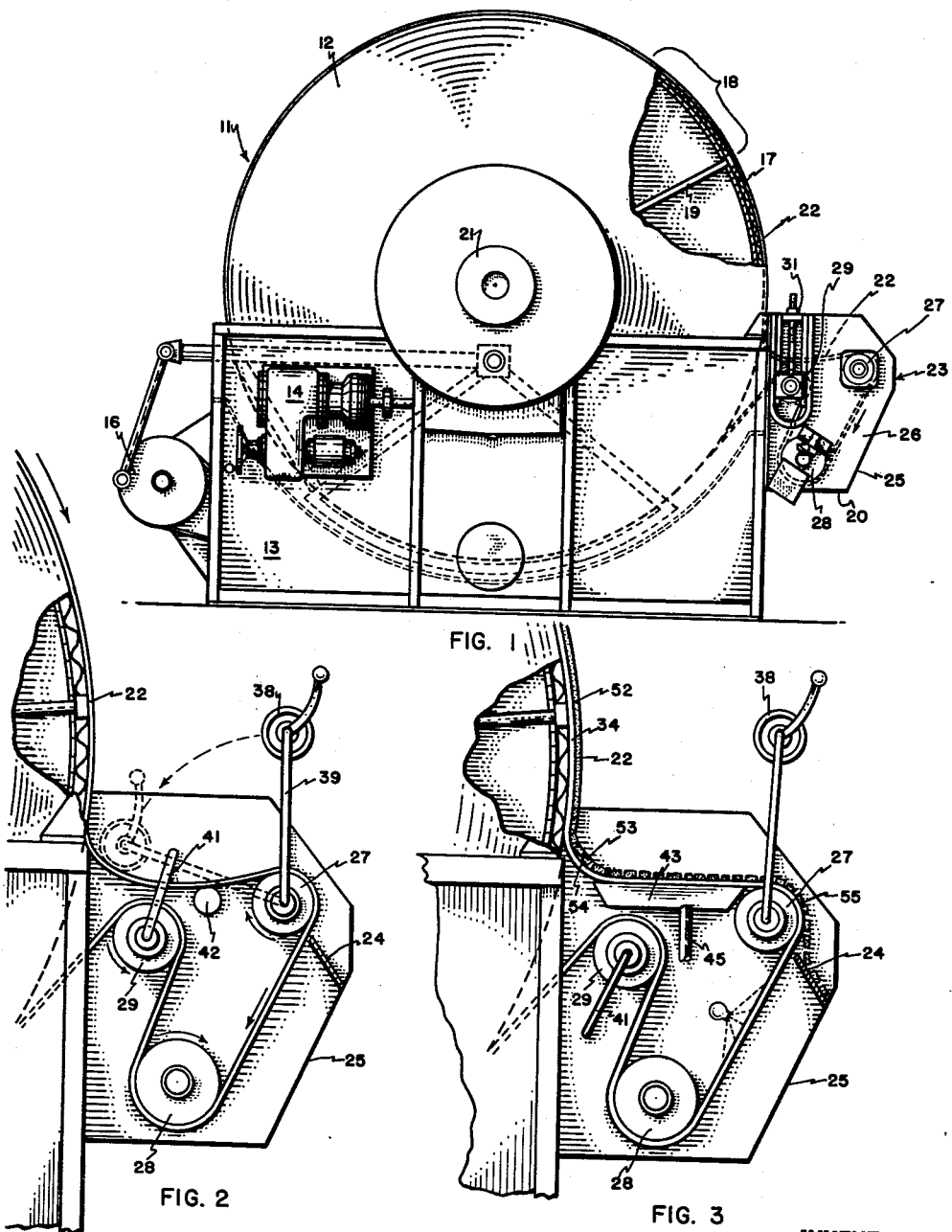

3,075,647
FILTRATION APPARATUS
Steven S. Davis, Bountiful, Utah, assignor to The Eimco Corporation, Salt Lake City, Utah, a corporation of Delaware
Filed Mar. 25, 1960, Ser. No. 17,551
1 Claim. (Cl. 210—401)

This invention relates to vacuum drum filters of the type employing an endless belt filter medium trained over the drum and at least one member spaced from the drum whereby successive portions of the belt travel successively through filtering and drying zones as it travels on the drum, thence is removed to pass over the spaced-apart member for cake discharge and cleaning and is returned to the drum.

It is a primary object of this invention to provide a filter of the type described having greatly increased cake drying and washing area over that available in designs heretofore employed.

A further object is to provide means on such a filter to facilitate cake discharge while still attaining the aforementioned objects of increased cake drying and washing area.

Another object is the provision of superior means for maintaining the endless belt in a smooth stretched condition across its entire width.

A still further object is to provide a structure for accomplishing the foregoing objects which structure is simple and economical of construction and is adaptable for installation on either new or already existing filters.

The present invention, by which the foregoing and possibly other objects are attained, is based upon my discovery that contrary to all prior teachings, it is not necessary to maintain the entire length of the endless belt under tension, but rather by proper manipulation, the belt may be rendered slack between the point of removal from the drum and the point of cake discharge thereby enabling the belt to be held against the drum for a longer period of time to thus take more complete advantage of available vacuum on the drum surface.

Briefly, the invention comprises utilizing at least one roll, or other means spaced from the drum and over which the belt passes to create a drag on the belt surface thereby placing tension on the belt between the roller and the point of belt return to the drum and at the same time slacking the belt on the opposite side of the roll or rolls between it and the drum surface. In other words, the belt is of a length greater than that required to encompass the drum and roll or rolls; the portion of belt downstream from the roll is under tension with the consequence that the belt is returned to the drum in a truly tangential fashion, whereas upstream thereof, the belt is not under tension but is slack and thus, due to the holding effect of vacuum at the drum surface, is kept in contact therewith for a greater length of time.

Removal of the belt from the drum is non-tangential to the drum surface, and this in itself present an exceptional advantage in facilitating cake removal due to the additional flexing of the cake prior to discharge. In other words, the belt is pulled from the drum surface by the application of force in a direction the reverse of which would describe a chord with the periphery of the drum.

In the usual endless belt filter, it is desirable and often necessary to provide means for aligning the belt in order to maintain it properly centered on the drum. Such aligning means are readily adaptable to use with my invention and will normally be positioned to act on the portion of the belt under tension i.e. the downstream section. The drag-roll may form at least a part of the aligning needs, or it may act as a belt spreader, or both.

In order that the invention may be more readily understood and carried into effect, it is hereinafter described with reference to the accompanying drawing it being understood that such description is offered by way of illustration only and is not to be taken as limiting since the scope of the invention is defined by the appended claims rather than by the description preceding them.

In the drawings:

FIG. 1 is an end elevational view, partially cut-away and partly schematic, of a drum filter embodying the present invention.

FIG. 2 is a partial view, somewhat schematic, illustrating details of the invention.

FIG. 3 is a view similar to FIG. 2 but illustrating details of a separate modification of the invention.

FIG. 4 is a partial front view of the filter illustrated in FIG. 1, portions of the endless belt being cut-away;

FIG. 5 is a view similar to FIG. 3 with certain elements employed to illustrate other elements.

FIG. 6 is a view taken in the plane of line 6—6 of FIG. 8.

FIG. 7 is a partial view taken in the plane of line 7—7 of FIG. 6.

FIG. 8 is a partial perspective view of the structure shown in FIGS. 5, 6 and 7, illustrating details of the adjusting mechanism.

In the several drawings, like reference numerals are employed to identify like members.

In the embodiment illustrated, the filter 11 comprises a drum 12 suitably mounted for rotation in a tank 13 driven by a suitable drive mechanism 14. The tank is equipped with agitating mechanism generally designated 16.

As is usual, the drum is provided with a drainage deck 17 divided into individual sectors 18 by division strips. Each of the sectors is subjected to vacuum applied through conduits 19 which are connected to a valve generally designated 21 which operates in known fashion to apply controlled vacuum to the drum surface sectors during rotation of the drum. Filtrate is withdrawn by any suitable means.

The filter is provided with a filter medium in the form of an endless belt 22 upon which cake is formed and which serves to remove cake from the drum.

Mounted on front of the tank 13 is a housing 23 through which the belt travels after removal from the drum and before return thereto. The housing 23 is provided with a deflector baffle 24 for deflecting discharged cake. The housing may be provided with a drain to remove wash liquid used in cleaning the belt. If desired, such liquid may be returned directly to the slurry tank. For purposes of simplicity the return line is omitted from the drawing.

Housing 23 includes a bottom 20, a front 25 and end walls 26 between which there are journalled for rotation three rolls, including a first or drag roll 27, a second roll 28 which may be an idler roll or may enter actively into the belt aligning mechanism if such be employed, and a third roll 29 which, in the embodiment illustrated, is provided with a take-up mechanism 31 for adjusting tension on the belt to aid in maintaining proper alignment on the drum.

In connection with belt alignment, it should be noted that the present invention does not depend on any particular aligning mechanism and in some cases the drag roll 27 may act as an aligning mechanism simply by providing it with known means for adjusting its parallelism with respect to that of the drum, or tension roll 29 may be adjusted to insure proper belt tracking, or separate aligning means of recent development may be employed.

As can be best seen in FIGS. 1, 2, 3 and 5, the belt does not follow a symmetrical path with respect to its departure from and return to the drum surface. This is due to the fact that the downstream portion of the belt, being under tension describes a true tangent to the drum surface at the point of return thereto whereas the upstream belt portion, not being under tension makes a non-tangential departure from the drum. The belt, being slack, is held on the drum surface by vacuum for a longer period of time until it is finally pulled from the drum to satisfy the replacement needs of the tensioned downstream belt portion.

In order to insure tension on the downstream belt portion and slack on the upstream portion, the first roll 27 is operated to create a drag on the belt thus automatically accomplishing the desired object. The simplest form of drag is friction such as is employed in the illustrated embodiment. The degree of friction necessary to attain desired tensioning may be determined emperically, but in general, it may be said that downstream tensioning and upstream slacking of the belt is simply accomplished by drag brought about by rotating the roll 27 in a direction counter to drum rotation or by holding the roll stationary or by letting it rotate with, but at a slower speed than the belt.

Referring to FIG. 4, the illustrated embodiment employs a roll having spiral lands which when viewed from the front converge toward the top center of the roll so that they exert an outward plowing or stretching effect on the belt as it passes thereover thus keeping it stretched smooth. The plowing effect of lands 36 also causes rippling of the belt surface which aids materially in dislodging cake and facilitates discharge as the belt turns over the roll 27.

In accordance with the invention, discharge of cake from the belt is positively enhanced by double flexing of the belt between the take-off point at the drum and the point where the belt passes over the first roll.

This double flexing is brought about by an inward folding or flexing of the outer surface of belt upon itself adjacent the take-off point followed by an outward folding or flexing of the same surface as the belt passes over the first roll. Stated another way, since the belt surface, as measured by a straight line extended along the belt surface from its point of contact with the first roll to the drum is non-tangential to the drum surface, an inward folding of the belt is effected; as the belt straightens then passes onto and over the first roll the folding is reversed. The resulting double flexing loosens the cake from the belt so that it readily separates as the belt passes over the first roll.

The double flexing effect is illustrated in FIG. 3. The cake 52 is formed as a continuous layer on the belt 22 and continues in such form until the belt is removed from the drum surface as at 53 and angled sharply away thereby causing the belt and cake to fold inwardly with the result that the cake is put under compression at its top surface but is stretched or decompressed on its under surface adjacent the belt; this breaks the adhesion between the cake and belt fibers so that upon reverse or outward bending of the belt and cake during passage over the roll 27, the cake readily drops off the belt. The breaking action is set forth in exaggerated form in FIG. 3 where it will be noted that the single continuous cake 52, upon inward flexing, breaks apart on the under side as at 54 also tearing loose from the belt and then upon outward flexing, breaks apart at the outer surface as at 55.

The cake breaking action is extremely important as it not only improves discharge of cake, but makes possible the gravity discharge of thin and/or sticky cakes that have heretofore resisted removal except by scrapers or reverse fluid flow. Moreover, the double flexing tends to keep fibers of the belt freed from intersticial deposits of solids so that washing is extremely effective. It is important to note that reverse flexing may be accomplished without any physical contact of the outer belt surface thereby avoiding the problem of pressing solids into the belt.

In connection with maintaining the belt smooth the spiral lands 36 on the first roll 27 are maintained in constant contact with the under surface of the belt and, in accordance with the invention, the roll, or other spiralled element, is mounted so to resist travel of the belt thereover. In other words, the belt has a greater relative forward travel rate than the roll, and this, coupled with the increased wrap-around of the belt on the roll effected by slacking of the belt (as opposed to tensioned belts) results in an extremely efficient spreading action not otherwise attainable with a single roll. The difference in relative speed between the belt and roll can be attained in a number of ways but a very advantageous method is illustrated in FIG. 4 where the roll 27 is shown as being rotated by suitable means, such as 37, counter to belt travel. The roll driving mechanism has been omitted from the other figures to avoid complicating the drawings unnecessarily.

During periods of shut-down when no vacuum is applied to the drum surface, the weight of the belt may cause it to fall away from the bottom of the drum thus causing misalignment and also permitting slurry to enter between the belt and drum. Moreover, if the belt is not in contact with a relatively large drum surface area, start up will be difficult if not impossible unless special steps are taken. In accordance with the invention these problems are obviated by a holding device which may take a variety of forms but, as shown schematically in FIGS. 2 and 3, advantageously comprises a roll or pipe 38 mounted on a swingable bracket 39 and adapted to be swung downwardly to be locked into engagement with the upper belt surface adjacent the drum surface. Suitable latch means, such as indicated at 41, may be employed to hold roll 38 in position until after vacuum has been re-applied to the drum and operation resumed. The roll 38, although not shown in FIG. 4 will extend across the entire face of the drum in order to contact the belt along the full length of the deck. In special cases, the roll 38 may be additionally employed as a press roll during operation and in such cases may be mounted to bear against the drum surface thus compressing the cake. If desired, the tension roll 29 may be tightened to a point where it places the entire belt under tension for purpose of shut down and start up.

To compensate for sagging of the belt due to cake weight, there is provided support means over which the belt passes between the drum and the first roll. Such support means may comprise a roll or a smooth pipe, such as indicated at 42 in FIG. 2, extending between the two side plates 26.

In special cases, where additional drainage is desired, the invention contemplates use of a special support as illustrated in the embodiment shown in FIGS. 3 and 5–8. In such arrangement, the support is in the form of a drainage tank 43 having a smooth perforated top surface 44 over which the belt rides, and provided with a drainage conduit 45 for carrying away filtrate. Additional cake drying may be attained by applying vacuum through conduit 45. Thus, the tank 43 may serve as an extension of the drum insofar as drying function is concerned. If desired, the tank may be replaced with a simple, smooth support plate.

The support member should be adjustable in order to maintain optimum residence of the belt on the drum. In the case of a roll or pipe, such as 42 in FIG. 2, any suitable means may be employed to change pipe position. With respect to the tank 43, it may be mounted in arcuate slots 46 in bracket 47 mounted on the side plates 26, and the bracket provided with elongated mounting slots 48. Both the tank and bracket are held in place by suitable bolts such as 49.

The amount of belt slack is adjustable by means of tension adjuster 31 (FIG. 4) in which rotation of nut 51 will cause threaded shaft 52 to raise or lower and thus raise or lower the third roll 29.

Advantages derived by use of my invention include:

(a) Significant increase in the effective surface area of the drum. In an actual test on a filter having a sector drum of 11½ feet diameter and 12 feet length, the belt was slacked and the vacuum valve adjusted so that vacuum was applied during rotation of the drum through two additional sectors. This amounts to about a 10% increase in effective drum area and, considering drying and/ or washing area alone, an increase of about 18%, depending upon the degree of drum submergence. Cake moisture decreased from 72% to 67% employing the invention.

(b) Remarkable increase in cake discharge efficiency. In the above mentioned test, raw sewage sludge was filtered and thin cakes of maximum thickness of 1/16 inch were readily and cleanly discharged in continuous operation. This compares with a minimum thickness of 1/8 inch which can be so discharged on filters not capable of double cake flexing.

(c) Superior washing performance. Since substantially the entire exposed drum surface is subjected to drying, washing may be applied at the very top of the drum which is considered optimum.

(d) Adaptability of existing machines. Adapting the invention to existing endless belt filters involves only the need to provide increased belt length and operation of the first roll to create a drag on the belt.

(e) Increased efficiency of belt smoothing due to increased wrap around of the belt on the spreader roll.

(f) Ease of maintenance. Since only a slack belt is employed, belt replacement is made much easier.

From the foregoing description, it will be seen that my simple concept of employing a vacuum drum, an elongated member parallel to and spaced from such drum, a belt of greater length than that necessary to describe the shortest closed path around opposite sides of the drum and roll, and means for creating drag on the belt as it passes over the roll; there is provided a filter having unique advantage of increased drying and washing time, improved cake discharge, and a superior belt smoothing mechanism. The structure by which all this is accomplished may be readily adapted to any existing filter.

I claim:

A filter comprising a drum journalled for rotation in a feed receiving tank; a plurality of elongated members outside said drum spaced apart from its outer surface and substantially parallel to the longitudinal axis thereof, a first one of said elongated members being frictionally resistant to the passage thereover of filter medium; a filter medium in the form of an endless belt trained successively about portions of said outer drum surface and the surface of all of said elongated members, said belt being of circumferential length in excess of the length of the shortest closed path encompassing said drum and all of said elongated members; said drum, said elongated members and said endless belt being mounted so that with respect to the direction of its movement said endless belt is removed from the drum at a point upstream from said elongated members and returned to said drum at a point downstream from said elongated members; and means for maintaining tension on said endless belt downstream from said elongated members while maintaining only that portion of said endless belt upstream from said frictionally-resistant elongated member substantially free from tension induced by stretching of said belt between it and said drum, said means comprising a source of vacuum and means connecting the outer surface of said drum thereto to hold successive portions of said endless belt on said outer surface, and driving means enabling rotation of said drum in a direction away from said elongated members downstream thereof to move successive portions of said endless belt filter medium over said elongated members against resistance to such movement and means for rotatably driving said first elongated member in a direction opposite to the direction of rotation of said drum.

References Cited in the file of this patent

UNITED STATES PATENTS

| | | |
|---|---|---|
| 1,472,574 | Wright et al. | Oct. 30, 1923 |
| 2,096,176 | Harrington | Oct. 19, 1937 |
| 2,812,064 | Siebenthal | Nov. 5, 1957 |
| 2,812,065 | Wilson | Nov. 5, 1957 |
| 2,916,145 | Kaiser | Dec. 8, 1959 |